United States Patent [19]

Campbell, Jr. et al.

[11] Patent Number: 5,721,966
[45] Date of Patent: Feb. 24, 1998

[54] INSTANT PHOTOGRAPHY CAMERA AND FILM CASSETTE

[75] Inventors: Thomas H. Campbell, Jr., Dedham; Edward H. Coughlin, Norwood; Irving S. Lippert, Lexington, all of Mass.

[73] Assignee: Polaroid Corporation, Cambridge, Mass.

[21] Appl. No.: 710,181

[22] Filed: Sep. 13, 1996

[51] Int. Cl.⁶ .................................................. G03B 17/50
[52] U.S. Cl. .................................................. 396/42; 396/36
[58] Field of Search ........................... 396/30–36, 42, 396/527, 517, 583

[56] References Cited

U.S. PATENT DOCUMENTS

| | | | |
|---|---|---|---|
| 3,779,770 | 12/1973 | Alston et al. | 396/33 |
| 3,799,770 | 3/1974 | Harada et al. | 396/33 |
| 3,832,731 | 8/1974 | Kinsman | 396/586 |
| 4,104,667 | 8/1978 | Scholz et al. | 396/493 |
| 4,226,519 | 10/1980 | Gervais et al. | 396/33 |

*Primary Examiner*—D. Rutledge
*Attorney, Agent, or Firm*—Robert A. Sabourin

[57] ABSTRACT

An instant photography camera can contain a combination of improved features including cleaning pads for continuous cleaning of spread rollers throughout the life of the camera, a flexible non-coiled film shade for preventing light piping along a film unit which is exiting the camera, and a dual independent spread control feature on a film cassette so that the same film cassette can be used in different cameras. The film cassette includes first and second spread control features for providing even spreading of processing liquid across a film unit; the first spread control feature used in a straight film track configuration, and the second spread control feature being used in a chute film track configuration.

4 Claims, 5 Drawing Sheets

INSTANT PHOTOGRAPHY CAMERA AND FILM CASSETTE

BACKGROUND OF THE INVENTION

1. Field of the Invention

The present invention is generally directed towards an improved instant photography camera, and more specifically, towards a camera or camera back having a film cassette with dual, independent spread control features.

2. Description of the Prior Art

An important step in the processing of an exposed instant or self developing type film unit, as pointed out in U.S. Pat. No. 3,799,770, is the spreading of a processing liquid between predetermined layers of the film unit to initiate the formation of a visible image therein via a diffusion transfer process. In order to obtain an optimum quality positive print, it is desirable that the processing liquid be spread such that it covers the entire photoexposed area of the film unit in a thin layer of predetermined uniform thickness.

A typical film unit includes a photosensitive element, an image-receiving element which may be superposed on the photosensitive element subsequent to exposure or may be transparent and predisposed on the photosensitive element such that exposure may be made through the image-receiving element, and a rupturable pod or container of processing liquid located at one end of the two elements.

In a typical self developing photographic system, a plurality of film units are arranged in stacked relation within a film cassette which is adapted to be inserted into the receiving chamber of an appropriate camera where a top film unit is located in the stack in position for exposure.

Subsequent to exposure, the top film unit is extracted from the film cassette and is advanced, pod end first, between a pair of pressure-applying members mounted within the camera. The pressure-applying members exert a compressive force on the pod causing it to rupture and discharge the liquid between predetermined layers of the film unit, e.g., between the exposed photosensitive element and the superposed image-receiving element. Continued advancement of the film unit between the pressure-applying members results in the liquid being advanced along a liquid wave front toward the trailing end of the film unit such that it is progressively distributed over the photoexposed area of the film unit.

The uniformity of the liquid layer is determined by several factors. One is a design of the pod and its rupture characteristics. Another is related to the viscosity and amount of liquid enclosed by the pod. The final thickness of the liquid layer is also influenced by the velocity at which the film unit is advanced through the pressure-applying members, the amount of compressing pressure exerted on the film unit, and the resistance to liquid flow at the interfaces between the liquid and the superposed film unit elements. An ideal wave front would uniformly spread the processing composition over a substantially rectangular or square photoexposed area. This can be accomplished when the wave front is disposed in a substantially straight line which extends outwardly to the lateral margins of the substantially rectangular or square photoexposed area and is oriented in a direction that is normal to the direction of film advancement between the pressure-applying members.

One commonly observed problematic spread shape is a tongue shape wherein the wave front progresses more rapidly at the central portion of the photoexposed or image-forming area, than at the lateral margins. This condition may be caused by an uneven distribution of liquid upon initial discharge from the pod, i.e., more liquid being concentrated at the center of the film unit than at its edges. In the subsequent spreading of the tongue-shaped wave front, it is possible that the corners of the image-forming area at the trailing end of the film unit will be uncoated or coated with a layer of liquid of reduced depth or thickness, thus, adversely affecting the film unit's sensitometry.

One method employed to compensate for a tongue-shaped wave front has been to provide excess liquid in the pod. Another method has been to equip the camera with spread control devices which serve to modify the shape of the liquid wave front during spreading. Examples of film assemblages which include film cassettes having processing liquid spread control features are found in U.S. Pat. Nos. 3,779,770, 3,832,731, 4,104,669, and 4,226,519.

The spread control devices are designed to apply a second compressive force to the central portion of the film unit in the path of the mass of liquid discharged from the pod by the pressure-applying members. This serves to retard the central portion of the wave front and cause a flow of liquid in a direction transverse to the direction of film advancement. In this manner, the wave front is modified such that it is substantially straight and is oriented in a direction substantially normal to the parallel sides of the rectangular or square image-forming area.

The present invention provides a film cassette having dual independent spread control features so that the same film cassette can be used in different cameras, i.e. cameras that have different functional processing designs. A camera according to the invention also includes a flexible non-coiled film shade for preventing fogging of a film unit which is exiting the camera, and cleaning pads for continuous cleaning of spread rollers throughout the life of the camera.

SUMMARY OF THE INVENTION

An instant photography camera can contain a combination of improved features including cleaning pads for continuous cleaning of spread rollers throughout the life of the camera, a flexible non-coiled film shade for preventing light piping along a film unit which is exiting the camera, and a dual spread control feature on a film cassette so that the same film cassette can be used in different cameras. The film cassette includes first and second spread control features for providing even spreading of processing liquid across a film unit; the first spread control feature being used in a straight film track configuration, and the second spread control feature being used in a chute film track configuration.

BRIEF DESCRIPTION OF THE DRAWINGS

The aforementioned aspects and other features of the invention are described in detail in conjunction with the accompanying drawings (not drawn to scale) in which the same reference numerals are used throughout for denoting corresponding elements.

DETAILED DESCRIPTION OF THE PREFERRED EMBODIMENTS

Figure 1:
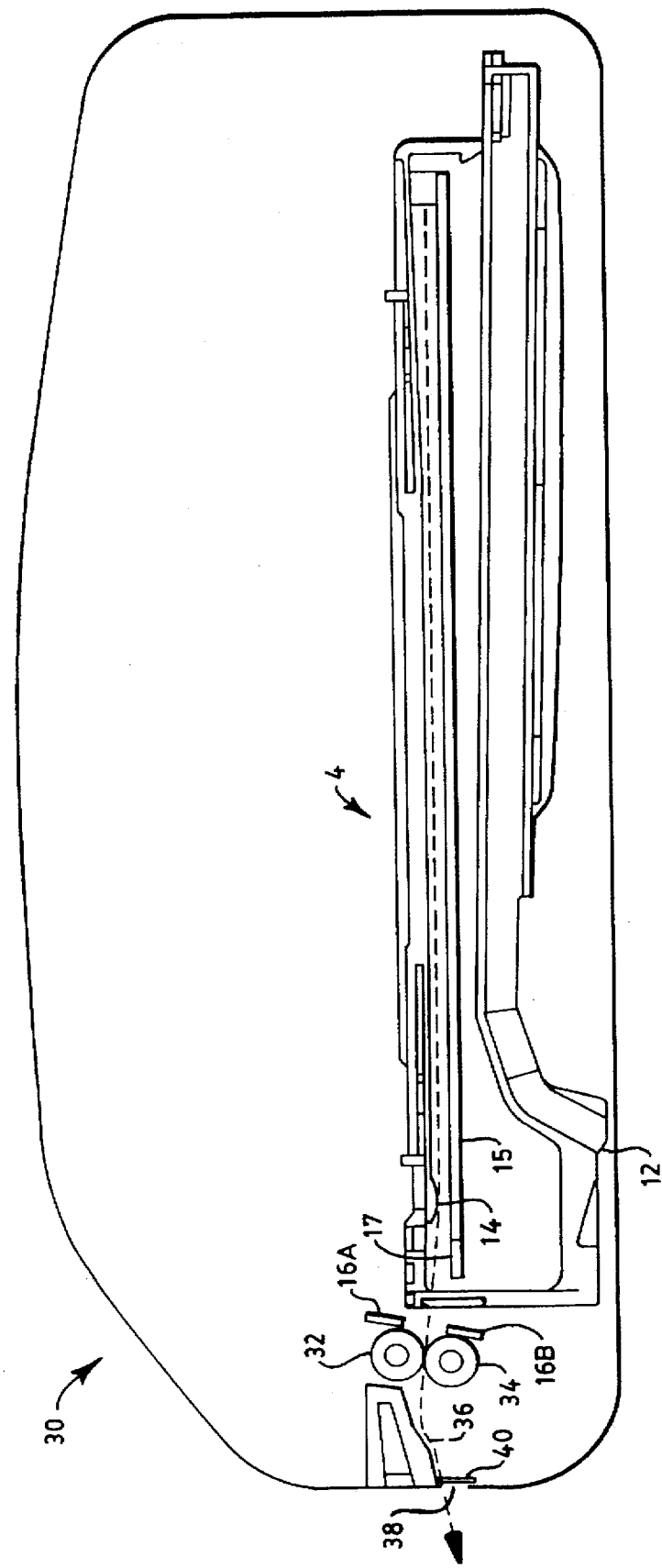
FIG. 1 is a side cutout view of an instant photography camera 30 having a film cassette 4 which is used with a straight film track configuration.

FIG. 1 shows an instant photography camera 30 having a film cassette 4. The film cassette 4 includes a number of film units 15, a first spread control feature 14 and a second spread control feature 12. After a picture is taken, a single film unit 15 is removed from the cassette 4 along path 36 (shown by the dotted line). The processing liquid in a pod 17 of the exiting film 15 is redistributed by the first spread control feature 14 to push more processing liquid towards the sides of the film unit 15 and modulate the thickness of the liquid layer. The exposed film unit 15 passes between spread rollers 32, 34 to exit the camera 30 through slot 38 after pushing through the flexible non-coiled light shade 40.

The spread rollers 32, 34 are continuously cleaned by cleaning pads 16A, 16B, respectively. These cleaning pods can be made from any material which adequately removes dust and other impurities from the rollers. In a preferred embodiment, roller 16A is made of Imperial Polishing Film without aluminum oxide and roller 16B is made of J. B. Martin 2120 black velvet. The materials are sized, selected and located to optimize dirt removal without inhibiting the operation of the rollers or damaging the rollers through abrasion. Material selection for the cleaning pads is further influenced by cleaning pad parameters such as pressure, setting and contact area. The cleaning pads can be electrostatically charged to remove (or repel) electrostatically charged particles, if desired.

Figure 3A:
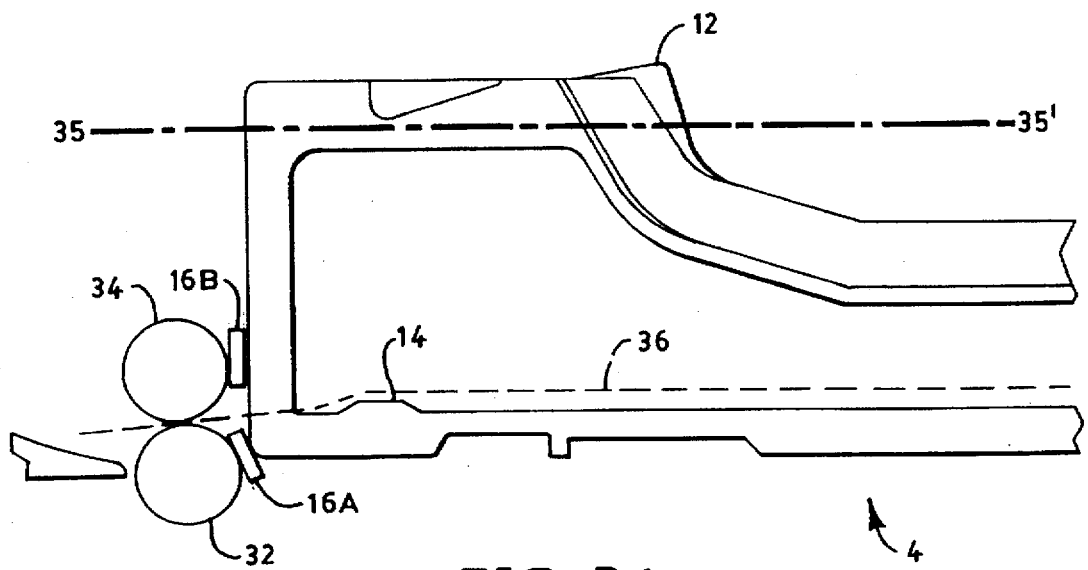
FIG. 3A is an enlarged partial side cutout view of the film cassette 4 of FIG. 1 which is used with a straight film track configuration.

A straight film track configuration is shown in FIG. 1 where an exposed film unit 15 will exit the camera 30 from along a substantially straight or linear film path (shown by the dotted line 36). The straight film track configuration is also shown in the enlarged partial top cutout view of the film cassette 4 in FIG. 3A.

Figure 2:
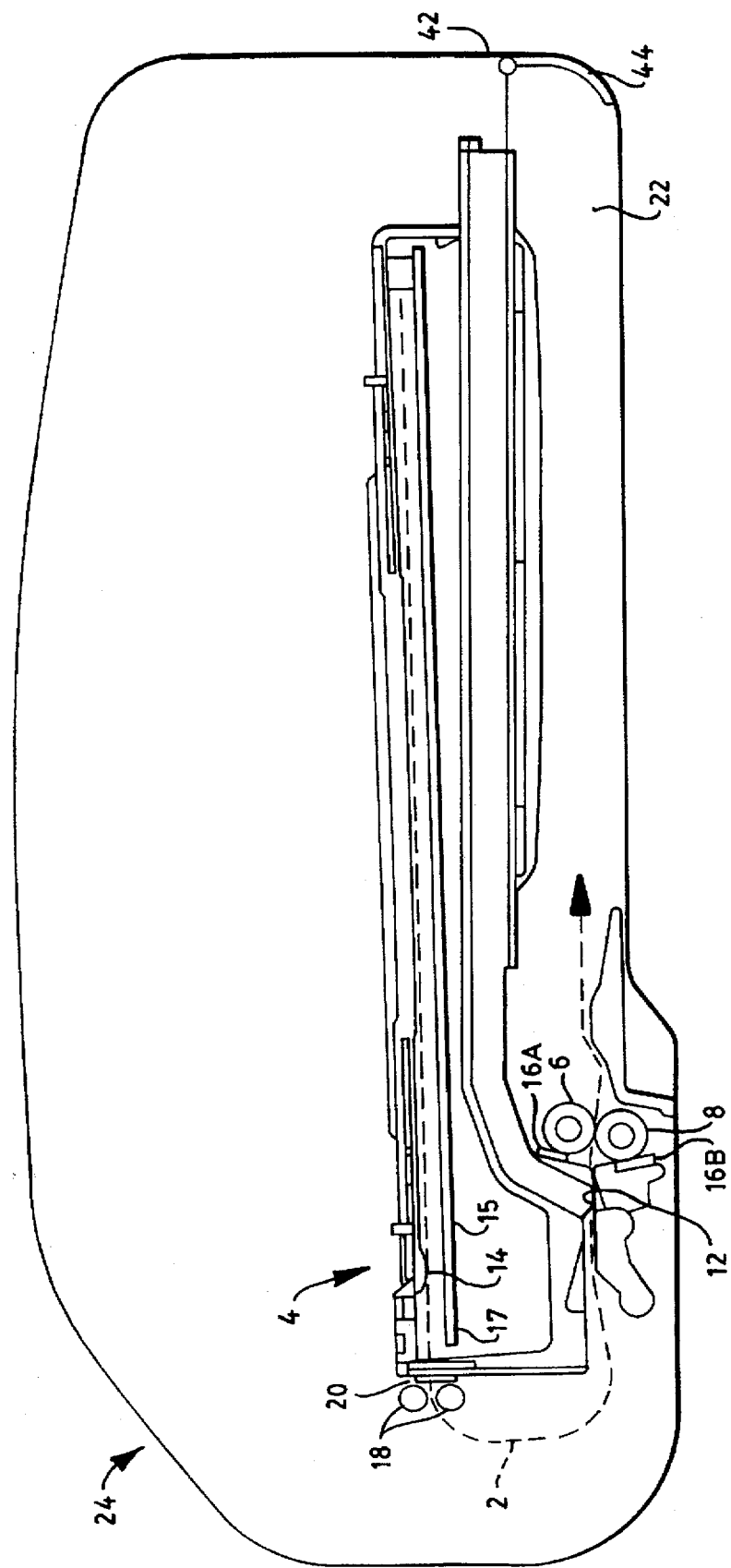
FIG. 2 is a side cutout view of an instant photography camera 24 having the same film cassette 4 of FIG. 1, but here the film cassette 4 is used with a chute film track configuration.
Figure 4:
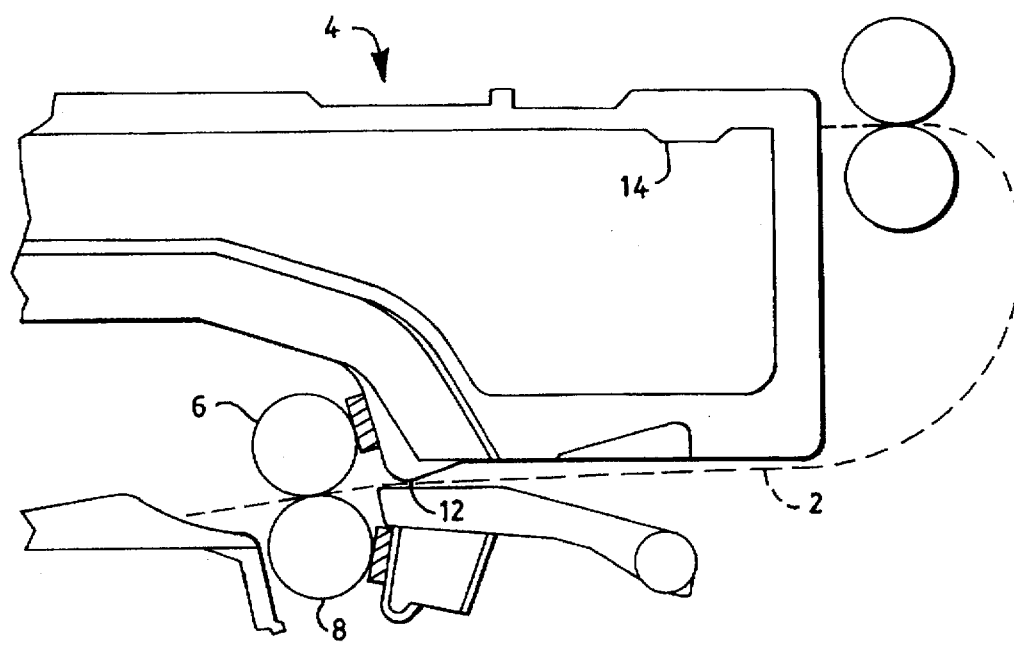
FIG. 4 is an enlarged partial side cutout view of the film cassette 4 of FIG. 1 which is used with a chute film track configuration.

In contrast to the substantially straight film path 36 of FIG. 1, FIG. 2 shows an exposed film unit 15 exiting the camera 24 along a curved film path 2, i.e. along a chute film track configuration, past a second spread control feature 12, through the spread rollers 6, 8 and into the storage compartment 22 where the exposed film unit can be accessed via door 44 which opens about hinge 42. FIG. 4 shows an enlarged partial top cutout view of the film cassette 4 used in a chute film track configuration.

The same film cassette 4 can be used in either a camera 30 (FIG. 1) having a straight film track configuration, or a camera 24 (FIG. 2) having a chute film track configuration. The first spread control feature 14 acts to spread processing liquid from the pod evenly across a film unit 15 without interference from the second spread control feature 12.

Figure 3B:
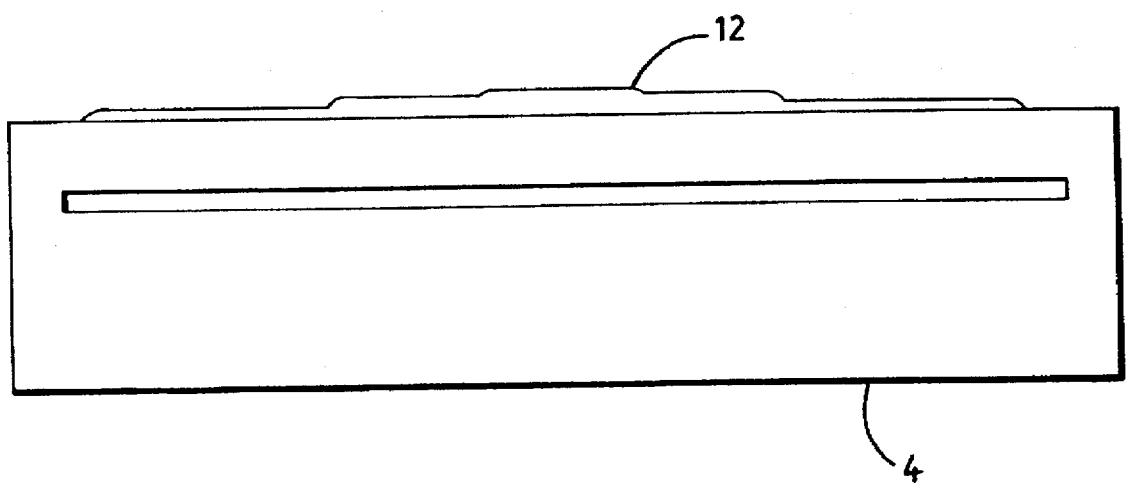
FIG. 3B is a front view of the film cassette 4 of FIG. 1 as viewed along the line 35-35' shown in FIG. 3A.

Conversely, the second spread control feature 12 acts to spread processing liquid from the pod evenly across a film unit 15 without interference from the first spread control feature 14. For a camera having a chute film track configuration, the processing liquid in a pod 17 of the exiting film unit 15 is redistributed by the second spread control feature 12 to push more processing liquid towards the sides of the film unit 15. The topography of the second spread control feature 12 is shown in FIG. 3B (front view of the cassette).

Figure 5D:
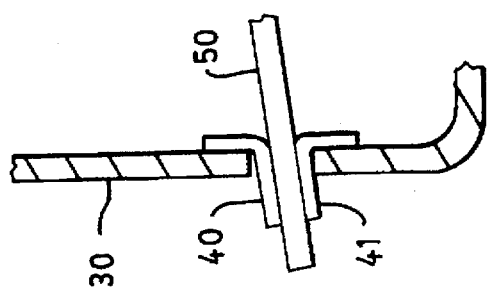
FIG. 5D is a partial side cutout view of a film segment 50 exiting through slot 38 of a camera 30, and in contact with the flexible non-coiled film shades 40 and 41.
Figure 5C:
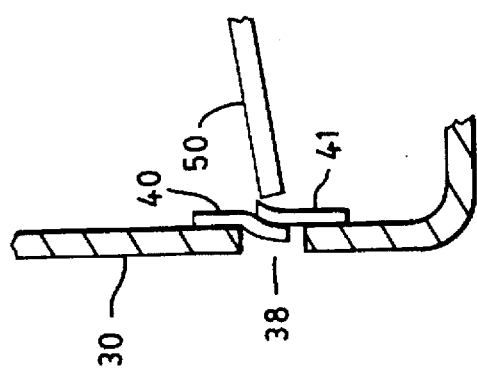
FIG. 5C is a partial side cutout view of a film segment 50 about to exit through slot 38 of a camera 30 prior to contacting the flexible non-coiled film shades 40 and 41.
Figure 5B:
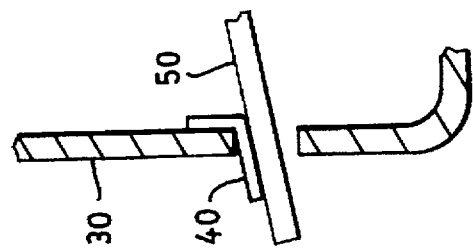
FIG. 5B is a partial side cutout view of a film segment 50 exiting through slot 38 of a camera 30, and in contact with the flexible non-coiled film shade 40.
Figure 5A:
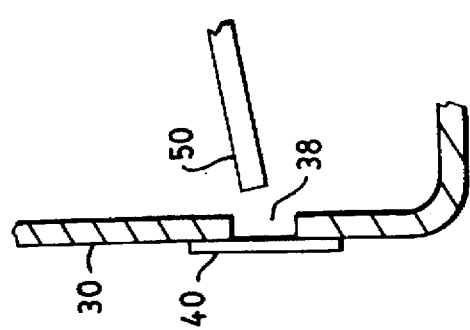
FIG. 5A is a partial side cutout view of a film segment 50 about to exit through slot 38 of a camera 30 prior to contacting the flexible non-coiled film shade 40.

When a film unit 15 first exits a camera 30, as through slot 38 shown in FIG. 1, light incident to the exiting film unit will travel along the film, a condition called light piping, causing excessive, unwanted, uneven exposure or fogging of the film. Light piping can be minimized by postponing light contact with the exiting film unit 15. This is accomplished using a film shade 40 as shown in FIGS. 1, 5A, 5B, 5C and 5D. One film shade embodiment is shown in FIGS. 5A and 5B for a single film shade 40 composed of a flexible, non-coiled, non-light penetrating material. A second embodiment is shown in FIGS. 5C and 5D where the film shade is composed of two overlapping pieces 40, 41 of flexible, non-coiled, non-light penetrating material.

It is to be understood that the above described features are merely illustrative of the many embodiments of the present invention. Numerous and varied other arrangements may be readily devised in accordance with these principles by those skilled in the art without departing from the spirit and scope of the invention as claimed.

What is claimed is:

1. An instant photography film cassette containing film units, each having a pod of processing liquid, said film cassette comprising:

a first spread control feature being used in a camera having a straight film track configuration for providing even spreading of said processing liquid across each said film unit, and a second spread control feature being used in a camera having a chute film track configuration for providing even spreading of said processing liquid across each said film unit.

2. An instant photography camera comprising:

a film cassette containing film units, each having a pod of processing liquid, said film cassette comprising a first spread control feature being used in a straight film track configuration for providing even spreading of said processing liquid across each said film unit, and a second spread control feature being used in a chute film track configuration for providing even spreading of said processing liquid across each said film unit;

spread rollers for breaking the pod and spreading the processing liquid across each said film unit;

cleaning pads for continuously cleaning said spread rollers; and a flexible non-coiled shade for delaying light exposure to each said film unit upon exiting the camera.

3. The camera of claim 2, wherein said flexible non-coiled shade extends far enough from the camera to prevent fogging of an exiting film unit.

4. The camera of claim 2, wherein said shade comprises two overlapping flexible non-coiled pieces extending far enough from the camera to prevent fogging of an exiting film unit.

* * * * *